US006659652B1

(12) United States Patent
Larsson

(10) Patent No.: US 6,659,652 B1
(45) Date of Patent: Dec. 9, 2003

(54) AUTOMATIC CONFIGURATION OF OPTICAL CROSS-CONNECTOR AT MANUAL CONNECTION

(75) Inventor: Stefan Larsson, Trangsund (SE)

(73) Assignee: Wavium AB, Stockholm (SE)

( * ) Notice: Subject to any disclaimer, the term of this patent is extended or adjusted under 35 U.S.C. 154(b) by 0 days.

(21) Appl. No.: 10/089,110

(22) PCT Filed: Oct. 18, 2000

(86) PCT No.: PCT/SE00/02016
§ 371 (c)(1),
(2), (4) Date: Apr. 16, 2002

(87) PCT Pub. No.: WO01/29597
PCT Pub. Date: Apr. 26, 2001

(30) Foreign Application Priority Data

Oct. 18, 1999 (SE) ................................. 9903735

(51) Int. Cl.[7] ................................. G02B 6/38
(52) U.S. Cl. ........................................ 385/59
(58) Field of Search ............... 386/135, 134–7, 386/139, 59; 370/388, 390

(56) References Cited

U.S. PATENT DOCUMENTS 5,377,182 A    12/1994   Monacos
5,394,503 A *   2/1995   Dietz et al. .................. 385/135
5,541,915 A *   7/1996   Storm ......................... 370/390
5,631,902 A *   5/1997   Yoshifuji .................... 370/388
5,872,904 A *   2/1999   McMillen et al. .......... 370/217
6,431,765 B1 *  8/2002   Chen et al. .................. 385/139

FOREIGN PATENT DOCUMENTS

JP    9224268    8/1997
JP   11313350   11/1999

* cited by examiner

Primary Examiner—Lynn Feild
Assistant Examiner—Thanh-Tam Le
(74) Attorney, Agent, or Firm—Oblon, Spivak, McClelland, Maier & Neustadt, P.C.

(57) ABSTRACT

An optical cross-connector for a signal connection between fiber-optical wires, including a plurality of ports for connection of fiber-optical connectors. A signal connection is configured to connect optical signals from the connectors between the ports, and a contact sensor is configured to register when fiber-optical connectors are connected to the ports. The signal connection is configured to automatically establish a signal connection from a first registered connection connector to a second registered connection connector. The optical cross-connector can be set to a position for automatic configuration in pairs of point-to-point signal connections, for broadcasting signal connection, or to a position without automatic configuration.

14 Claims, 1 Drawing Sheet

AUTOMATIC CONFIGURATION OF OPTICAL CROSS-CONNECTOR AT MANUAL CONNECTION

FIELD OF THE INVENTION

The present invention relates to an optical cross-connector for fiber-optical tele and data communication systems, and a method for automatic configuration of the ports of said cross-connector.

BACKGROUND

The development of fiber-optical transmission systems for digital traffic makes possible very high transmission speeds. Networks like SONET and SDH are intended for, for instance, tele and data communication, and offers transmission speeds of up to several Gbit/s. The advantages of optical networks compared with traditional electric networks are obvious, and SONET is for instance specified in the standard for broadband-ISDN (B-ISDN). At use of complex optical networks it is advantageous to utilize so called optical cross-connectors, intended to reroute wavelength channels, or optical signals generally. An optical cross-connector is a network device intended for telecommunication carriers to change optical high-speed signals. They differ from a digital cross-connector in that it deals with multiple high speed signals which are changes in full and are not multiplexed together. Characteristic of the optical cross-connector is that it operates in the optical domain (physical layer), that is, it only deals with optical channels (bit streams) without manipulating in that included information or channel integrity. Even when the optical channel at import respective export is in the optical domain, the channel can locally in the cross-connector change to electrical form, however still as a retained channel. Two forms of optical cross-connectors thus are possible, the transparent one, or the opaque one.

An optical cross-connector that is intended to reroute wavelength channels, or optical signals in general, is characterized in a number of in-and out-ports. There are indications that such optical cross-connectors in the future can have a large number of ports, up to 1,024 or more. At practical handling of these cross-connectors, manual connection of fiber-optical connectors for each out-and in-port, i.e. for each wavelength channel or optical signal generally, is needed. After this manual handling, which must be performed in a systematical and documented way, wanted cross-connection of in-ports to out-ports is made by means of software that handles the mangement of the optical cross-connector. Two operations consequently are needed; one manual part which must be documented and systematical (connect right connector to right port) and a terminal controlled part (via a management system make wanted cross-connections).

SUMMARY OF THE INVENTION

The present invention consequently aims at providing an optical cross-connector, and a method for configuration of this, which bridges the problems of known technology. More exactly it is an aim to provide a cross-connector for which the handling at connection and configuration of fiber-optical connectors is simplified.

These aims are achieved by a device for signal connection between fiber-optical wires, including a plurality of ports for connection of fiber-optical connections, and which have signal connection means arranged to connect optical signals between said ports. Characteristic of the invention is that a contact sensor is arranged to register when fiber-optical connectors are connected to said ports. The signal connection means is at that arranged to automatically establish a signal connection from a first registered connected connector to a second registered connected connector.

In one embodiment the optical cross-connector can be arranged to be set to automatically configure, in pairs, point-to-point signal connections between registered, connected connectors. The device also can be possible to set to a position for automatic configuration of broadcast signal connection from a registered, connected connector to other registered connected connectors. Said contact sensor can be an optical sensor, arranged to sense electromagnetic radiation from a connected fiber-optical connector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
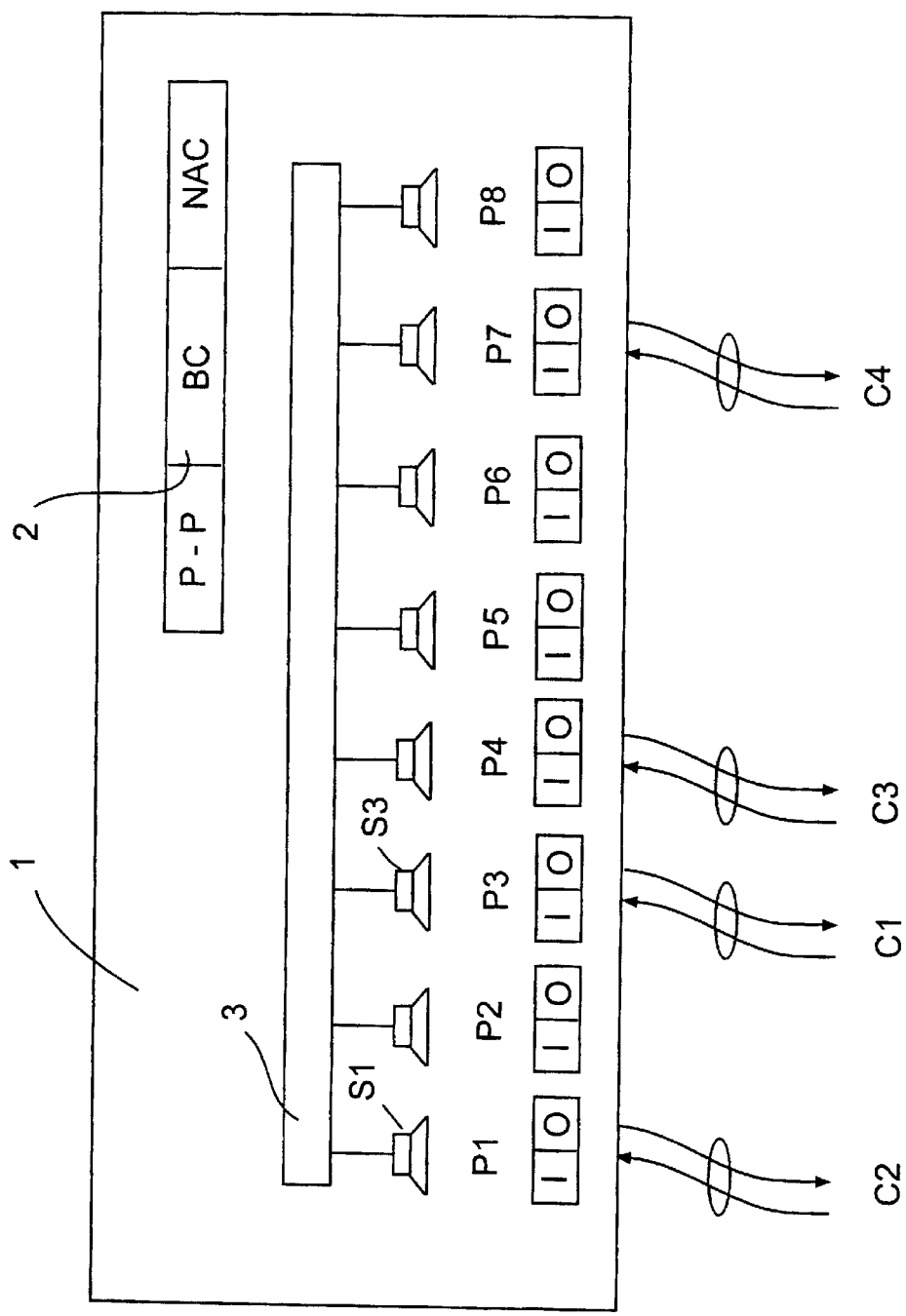
FIG. 1 is an embodiment of an optical cross-connector according to the present invention.

The invention now will be described in detail with reference to the only FIG. 1, which shows a preferred embodiment of an optical cross-connector according to the present invention. The operation with an manual part and a terminal-controlled part as has been described above is simplified according to the invention by an automatic configuration of the optical cross-connector that is shown in FIG. 1. At connection of a fiber-optical connector to a port of the cross-connector, this is registered, either via detection of incoming electromagnetic radiation, or in another way, and cross-connection internally in the cross-connector then can be made directly at registration of next connected connector. By means of the figure a simple example can illustrate the invention. In FIG. 1, the ports are described as two-way, but they can also be one-way.

At the cross-connector 1, there is a selector 2, which can be set to the positions "no auto-configuration" NAC, "point-to-point" P-P, or "broadcast" BC. Say that the position "point-to-point" is used. To in-/out-port P3, represented by I for in and O for out, connector C1 is connected, which is registered as the first connected connector by a contact sensor S3 for the port P3. To in/out-port P1 then connector C2 is connected, which is registered by the contact sensor S1. When the selector 2 is set at P-P, the cross-connector then automatically internally connects in-/out-port P1 to in-/outport P3, via signal connection means 3. This point-to-point connection is now established by the autoconfiguration. Then C3 is connected to port P4, and C4 to port P7; the connections are registered by respective contact sensors and are then automatically interconnected by the signal connection means 3 of the cross-connector in the same way as before. This procedure can then go on until all in-/out-ports have been connected and formed pairs.

If the selector 2 of the cross-connector is set in position "broadcast", the first connected connector, for instance C1, is registered as the source which then are connected to all other connected ports, in the shown case C2, C3 and C4. This of course will only work in one direction. For cross-connections which are not of the simple type "point-topoint" or "broadcast", the position "no auto-configuration" shall be used, and the management/handling system is used in ordinary way.

The invention is suited for use in optical networks which utilize optical cross-connectors for control of wavelength channels, or for cross-connection of optical signals between data communication switches. Another possible application is for broadcast of optical signals in cable-TV networks.

More variants of the described embodiments are possible, and this patent application lay claims to all such variants, provided that they are within the scope of the appended patent claims.

What is claimed is:

1. Device for signal connection between fiber-optical wires, comprising:
   a plurality of ports for connection of fiber-optical connectors;
   signal connection means for connecting optical signals between said ports;
   a contact sensor configured to register when fiber-optical connectors are connected to said ports; and
   wherein said signal connection means is configured to automatically establish a signal connection from a first registered connected connector to a second registered connected connector according to one of a plurality of automatic configuration modes.

2. The device for signal connection as claimed in claim 1, further comprising a selector configured to be set to a position for automatic configuration of point-to-point signal connections in pairs between registered connected connectors.

3. The device for signal connection as claimed in claim 1, further comprising a selector configured to be set to a position for automatic configuration of broadcast signal connection from a registered connected connector to other registered connected connectors.

4. The device for signal connection as claimed in claim 2, wherein said selector can be set to a position in which no automatic configuration is performed.

5. The device for signal connection as claimed in claim 3, wherein said selector can be set to a position in which no automatic configuration is performed.

6. The device for signal connection as claimed in claim 1, wherein said ports are one-way, and said signal connection means is configured to connect optical signals from in-ports to out-ports.

7. The device for signal connection as claimed in claim 1, wherein said ports are two-way, and said signal connection means is configured to connect optical signals between just any ports.

8. The device for signal connection as claimed in claim 1, wherein said contact sensor is an optical sensor, configured to sense electromagnetic radiation from a connected fiber-optical connector.

9. Method for configuration of optical cross-connectors, comprising:
   manually connecting a first and a second fiber-optical connector to a first and a second port of an optical cross-connector, respectively;
   automatically sensing, by a contact sensor, the connection of the first fiber-optical connector to the first port, and the connection of the second fiber-optical connector to the second port;
   registering said connections chronologically; and
   automatically connecting optical signals from the first registered connection to the second registered connection by a signal connection according to one of a plurality of connection modes.

10. The method as claimed in claim 9, wherein the automatic connection of optical signals is performed in pairs point-to-point between connected fiber-optical connectors.

11. The method as claimed in claim 9, wherein the automatic connection of optical signals is performed by broadcasting from a first registered connected fiber-optical connector to other registered connected fiber-optical connectors.

12. The method as claimed in claim 9, wherein a selector in the cross-connector is set for:
   automatic configuration of signal connection from point-to-point, or
   automatic configuration of signal connection in broadcasting, or
   no automatic configuration of signal connection.

13. The method as claimed in claim 10, wherein a selector in the cross-connector is set for:
   automatic configuration of signal connection from point-to-point, or
   automatic configuration of signal connection in broadcasting, or
   no automatic configuration of signal connection.

14. The method as claimed in claim 11, wherein a selector in the cross-connector is set for:
   automatic configuration of signal connection from point-to-point, or
   automatic configuration of signal connection in broadcasting, or
   no automatic configuration of signal connection.

* * * * *